US009951801B2

(12) United States Patent
Hsu et al.

(10) Patent No.: US 9,951,801 B2
(45) Date of Patent: Apr. 24, 2018

(54) FLOAT CONNECTOR

(71) Applicant: Intex Recreation Corp., Long Beach, CA (US)

(72) Inventors: Yaw Yuan Hsu, Fujian (CN); Kun Chao Hsu, Fujian (CN); Jinqie You, Fujian (CN)

(73) Assignee: Intex Marketing Ltd., Tortola (VG)

( * ) Notice: Subject to any disclaimer, the term of this patent is extended or adjusted under 35 U.S.C. 154(b) by 5 days.

(21) Appl. No.: 14/523,861

(22) Filed: Oct. 25, 2014

(65) Prior Publication Data

US 2015/0139723 A1     May 21, 2015

(30) Foreign Application Priority Data

Oct. 25, 2013   (CN) ..................... 2013 2 0662215 U

(51) Int. Cl.
*F16B 3/00* (2006.01)
*B63B 35/38* (2006.01)
*B63B 22/04* (2006.01)

(52) U.S. Cl.
CPC ................ *F16B 3/00* (2013.01); *B63B 35/38* (2013.01); *B63B 22/04* (2013.01); *Y10T 403/7005* (2015.01)

(58) Field of Classification Search
CPC .. F16B 3/00; F16B 21/00; F16B 21/02; F16B 21/04; F16B 7/20; B63B 35/38; B63B 22/04; Y10T 403/7005; Y10T 403/589; Y10T 403/7007; Y10T 24/45089; Y10T 279/17888; Y10T 278/17974; Y10T 24/4578; Y10T 403/50; F16L 37/248; F16L 37/252; H10R 13/625; H10R 13/71; B23B 31/1113; B23B 2240/04

USPC ........ 403/292, 293, 348, 349, 286; 439/332, 439/337; 285/92

See application file for complete search history.

(56) References Cited

U.S. PATENT DOCUMENTS

| 67,039 | A |   | 7/1867  | Golding |
|--------|---|---|---------|---------|
| 535,278 | A | * | 3/1895 | Downing ................. F16B 21/02  403/348 |
| 805,674 | A | * | 11/1905 | Senderling ............. B64D 17/32  24/573.11 |
| 1,362,521 | A | * | 12/1920 | Zadora ................... F16L 37/248  285/361 |
| 2,138,576 | A | * | 11/1938 | Gebert .................... B65G 33/32  198/666 |
| 3,104,896 | A | * | 9/1963 | Kennedy, Jr. ......... F16L 37/248  285/18 |
| 3,860,209 | A | * | 1/1975 | Strecker .................... B60P 7/13  24/265 CD |
| 4,202,134 | A |   | 5/1980 | Morrison |
| 4,400,856 | A | * | 8/1983 | Tseng ....................... B60P 7/13  24/109 |
| 4,894,033 | A |   | 1/1990 | Chang |
| 5,020,465 | A |   | 6/1991 | Langford |

(Continued)

OTHER PUBLICATIONS

Tube Pro Inc., "Tube-to-Tube Connectors," available online at http://www.tubeproinc.com/m/content/article.php?content_id=7 at least as early as Oct. 25, 2013, 1 page.

*Primary Examiner* — Theodore V Adamos
(74) *Attorney, Agent, or Firm* — Faegre Baker Daniels LLP

(57) ABSTRACT

A floatation device includes at least one connector that intertwines with a connector of another floatation device to couple the floatation devices together.

30 Claims, 6 Drawing Sheets

(56) References Cited

U.S. PATENT DOCUMENTS

| | | | |
|---|---|---|---|
| 5,301,454 A * | 4/1994 | Chen | A01K 91/03 24/580.1 |
| 5,507,674 A | 4/1996 | Yeung | |
| 5,536,009 A | 7/1996 | Edwards | |
| 5,857,713 A * | 1/1999 | Horimoto | F16L 37/252 285/114 |
| 6,053,790 A | 4/2000 | Langford | |
| 6,652,180 B2 * | 11/2003 | Foreman | F16B 7/00 403/296 |
| 6,905,279 B2 | 6/2005 | Metzger | |
| 7,243,953 B2 * | 7/2007 | Nakamura | F16L 37/252 285/360 |
| 7,530,607 B2 * | 5/2009 | Luft | F16B 7/0406 285/402 |
| D594,317 S * | 6/2009 | Anthony | D8/382 |
| D603,926 S | 11/2009 | Merker et al. | |
| 8,066,540 B2 | 11/2011 | Le Gette et al. | |
| D658,257 S | 4/2012 | Whitehead | |
| 2004/0038603 A1 | 2/2004 | Gaspar | |
| 2005/0123346 A1 * | 6/2005 | Nakamura | F16B 7/0406 403/348 |
| 2006/0116039 A1 | 6/2006 | Pole et al. | |
| 2006/0280553 A1 * | 12/2006 | Anthony | F16B 7/0426 403/348 |
| 2009/0087256 A1 * | 4/2009 | Nakamura | F16B 7/0406 403/349 |
| 2010/0229960 A1 | 9/2010 | Merker et al. | |
| 2013/0225018 A1 | 8/2013 | Peterson | |

\* cited by examiner

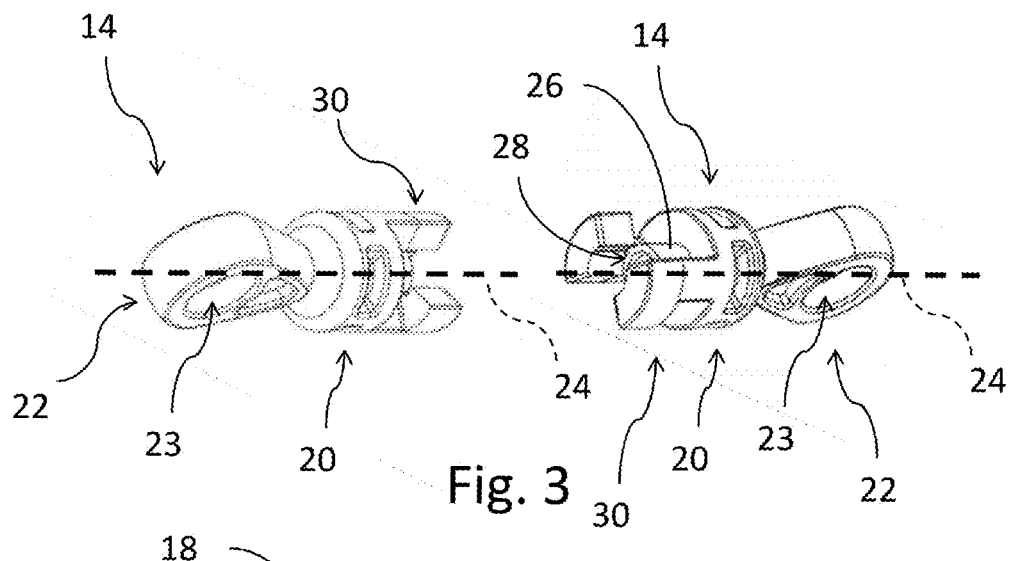
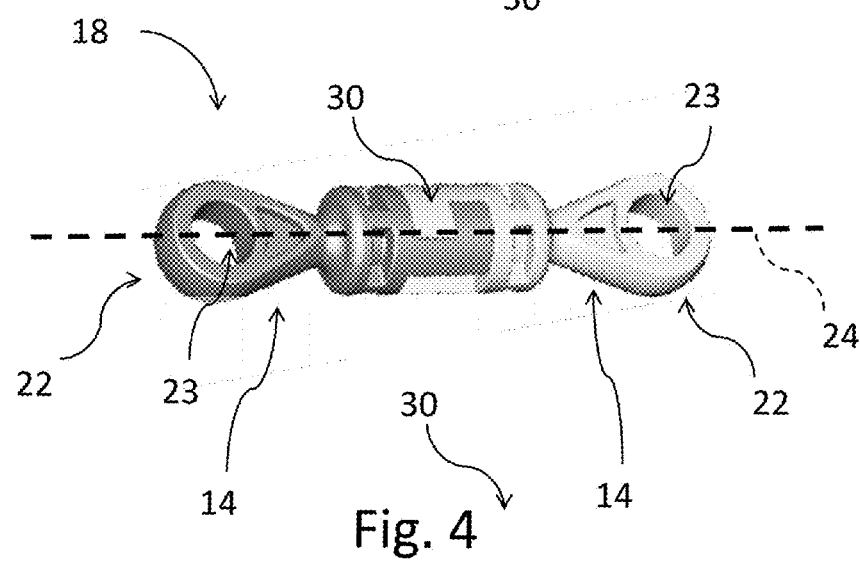

FLOAT CONNECTOR

RELATED APPLICATIONS

This application claims priority to Chinese Patent Application Serial No. 201320662215.0, entitled "Float Connector" to Yaw Yuan Hsu et al., under 35 U.S.C. § 119(b), a copy of which is provided in the Appendix hereof.

BACKGROUND OF THE INVENTION

This invention relates to floats, such as tube shaped floats. More particularly, the present invention relates to connectors for connecting at least two floats together.

According to the present disclosure, a connector of a connector pair is provided including a connector base having an axis, a loop coupled to the connector base and configured to receive a flexible line, an extension centered on the axis, and a plurality of arms extending from the connector base and cooperating to define a space therebetween sized to receive an extension of another connector of the connector pair.

According to another embodiment of the present disclosure, a connector of a connector pair is provided including a connector base, a loop coupled to the connector base and configured to receive a flexible line, and a plurality of arms extending from the connector base. Each of the plurality of arms includes at least one finger extending from each of the arms. Each of the fingers and the connector base cooperate to define a finger-receiving space therebetween sized to receive a finger of another connector of the connector pair.

According to another embodiment of the present disclosure, a connector of a connector pair is provided including a connector base, a loop coupled to the connector base and configured to receive a flexible line, and means for intertwining with a substantially identical connector of the connector pair.

According to another embodiment of the present disclosure, a connector of a connector pair is provided including a connector base, an opening member coupled to the connector base and defining an opening sized to receive a flexible strap, and a plurality of arms extending from the connector base. Each of the plurality of arms includes at least one finger extending from each of the arms. Each of the fingers and the connector base cooperate to define a finger-receiving space therebetween sized to receive a finger of another connector of the connector pair.

Additional features of the disclosure will become apparent to those skilled in the art upon consideration of the following detailed description when taken in conjunction with the accompanying drawings. Unless otherwise indicated, the drawings are to scale.

BRIEF DESCRIPTION OF THE DRAWINGS

A detailed description particularly refers to the accompanying figures in which:

FIG. 3 is a perspective view of a pair of suitable float connectors showing the float connectors spaced apart from each other so that corresponding tubular floats (not shown) are uncoupled from each other;

FIG. 4 is another perspective view of the pair of float connectors of FIG. 3 showing the float connectors coupled together so that the corresponding tubular floats are coupled to each other;

BRIEF DESCRIPTION OF THE APPENDIX

The attached appendix includes a copy of Chinese Patent Application Serial No. 201320662215.0, entitled "Float Connector" to Yaw Yuan Hsu et al., the entire disclosure of the appendix is incorporated by reference herein.

DETAILED DESCRIPTION OF THE DRAWINGS

Figure 1A:
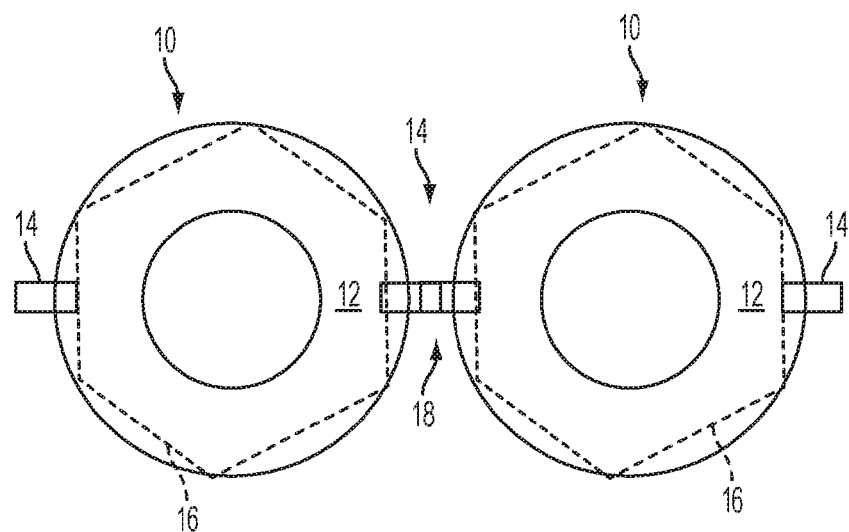
FIG. 1A is a diagrammatic view of a set of tubular float devices coupled to each other by a pair of float connectors.
Figure 1B:
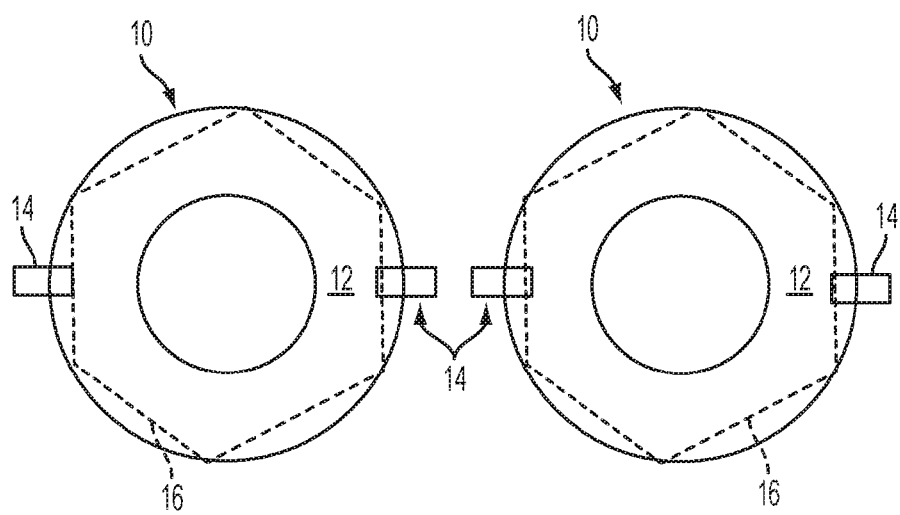
FIG. 1B is a diagrammatic view of the set of tubular float devices of FIG. 1A uncoupled from each other.

Two pairs of floatation devices 10 are shown in FIGS. 1A and 1B. According to the present disclosure, floatation devices 10 can be connected together as shown by the pair of floatation devices 10 in FIG. 1A or separated as shown by the pair of floatation devices 10 in FIG. 1B. As shown in FIGS. 1A and 1B, floatation devices 10 are inflatable tubular floatation devices sometimes referred to as inner tubes. Although only two floatation devices 10 are shown connected, more floatation devices 10 may be provided so that three or more floatation devices 10 may be connected together to provide a connected flotilla. According to the preferred embodiment, floatation devices are about 4 feet in diameter.

According to the preferred embodiment of the present disclosure, each floatation device 10 includes a toroid/doughnut-shaped inflatable body 12, at least one connector 14, and a flexible line 16 that couples connector 14 to inflatable body 12. Connectors 14 are configured to couple to each other. According to the preferred embodiment of the present disclosure, connectors 14 are substantially identical and intertwine to connect to each other to form a connector pair 18.

Figure 2A:
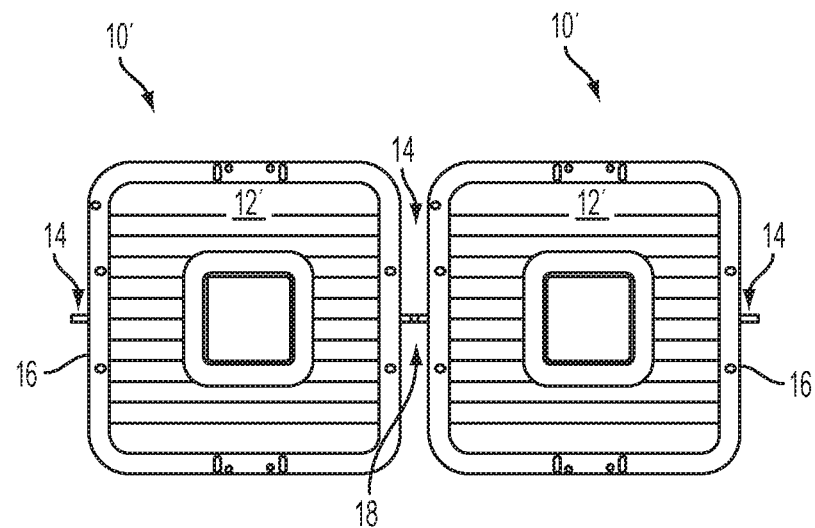
FIG. 2A is a top plan view of a set of square tubular float devices coupled to each other by a pair of float connectors.
Figure 2B:
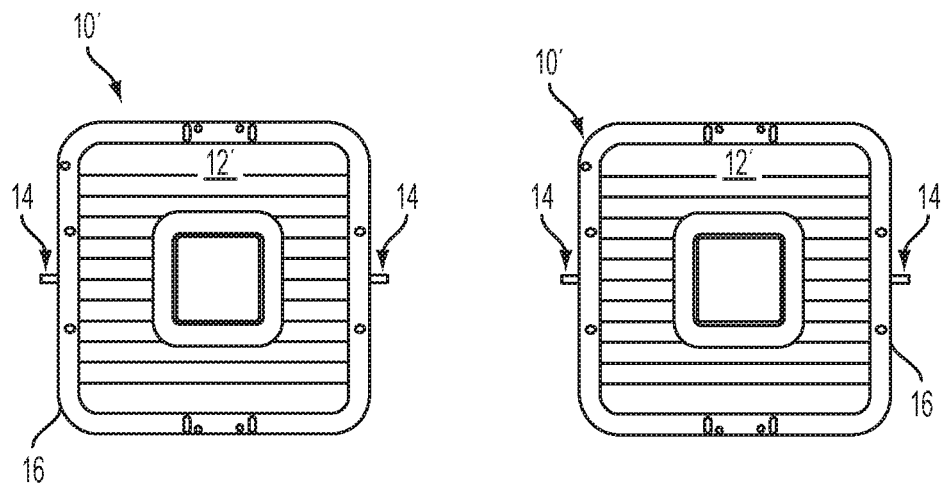
FIG. 2B is a top plan view of the set of square tubular float device of FIG. 2A uncoupled from each other.

According to alternative embodiments other floatation devices may be provided. For example, square tubular flotation devices 10' are shown in FIGS. 2A and 2B. Each tubular flotation device 10' includes square-shaped tubular inflatable bodies 12', at least one connector 14, and a flexible line 16 that couples connector 14 to inflatable body 12'.

According to the preferred embodiment of the present disclosure, flexible line 16 is a nylon strap. According to other embodiments, other flexible lines types may be provided, such as natural or synthetic ropes, cords, cables, etc. As shown in FIGS. 1A and 1B, each floatation device includes a pair of connectors 14. According to alternative embodiments of the present disclosure, fewer or more connectors 14 may be provided.

A preferred embodiment connector 14 is shown in FIG. 3. Connector 14 of connector pair 18 includes a connector base 20 and a loop 22 coupled to connector base 20. Loop 22 may also be referred to as an opening member 22 that has an opening 23 that is configured to receive flexible line 16. According to the preferred embodiment of the present disclosure, loop 22 is a full loop. According to other embodiments, loop 22 may be a partial loop, such as a hook with an open side. According to the preferred embodiment, loop 22 is one-piece and integral with connector base 20. According to other embodiments, loop 22 is formed of two or more pieces to facilitate the insertion of flexible line 16 through a side of the loop 22. One of these pieces may be hinged to form a clip such as a gated carabiner or have a nut such as a screw link. According to the preferred embodiment, connector 14 is about 2 inches long and connector base 20 has a diameter of about 0.63 inches.

Flexible line 16 may be secured to loop 22 in several manners. For example, flexible line 16 may be secured at both ends to inflatable body 12 with a middle portion of flexible line 16 extending through loop 22 so that loop 22 is blocked from removal from flexible line 16 by the two ends secured to inflatable body 12. Flexible line 16 may be secured at one end to inflatable body 12 and have a knot on the other end with a middle portion of flexible line 16 extending through loop 22 so that loop 22 is blocked from removal from flexible line 16 by the end of flexible line 16 secured to inflatable body 12 and the knot. According to the preferred embodiment of floatation device 10, a loop (not shown) is molded into or welded to plastic inflatable body 12 so that a portion of flexible line 16 extends through the loop.

Connector base 20 includes an axis 24 that extends through a longitudinal center of connector base 20. Each connector 14 further includes an extension 26 that is centered on axis 24. According to the preferred embodiment of the present disclosure, extension 26 is cylindrical and has a cylindrical aperture 28.

Figure 5:
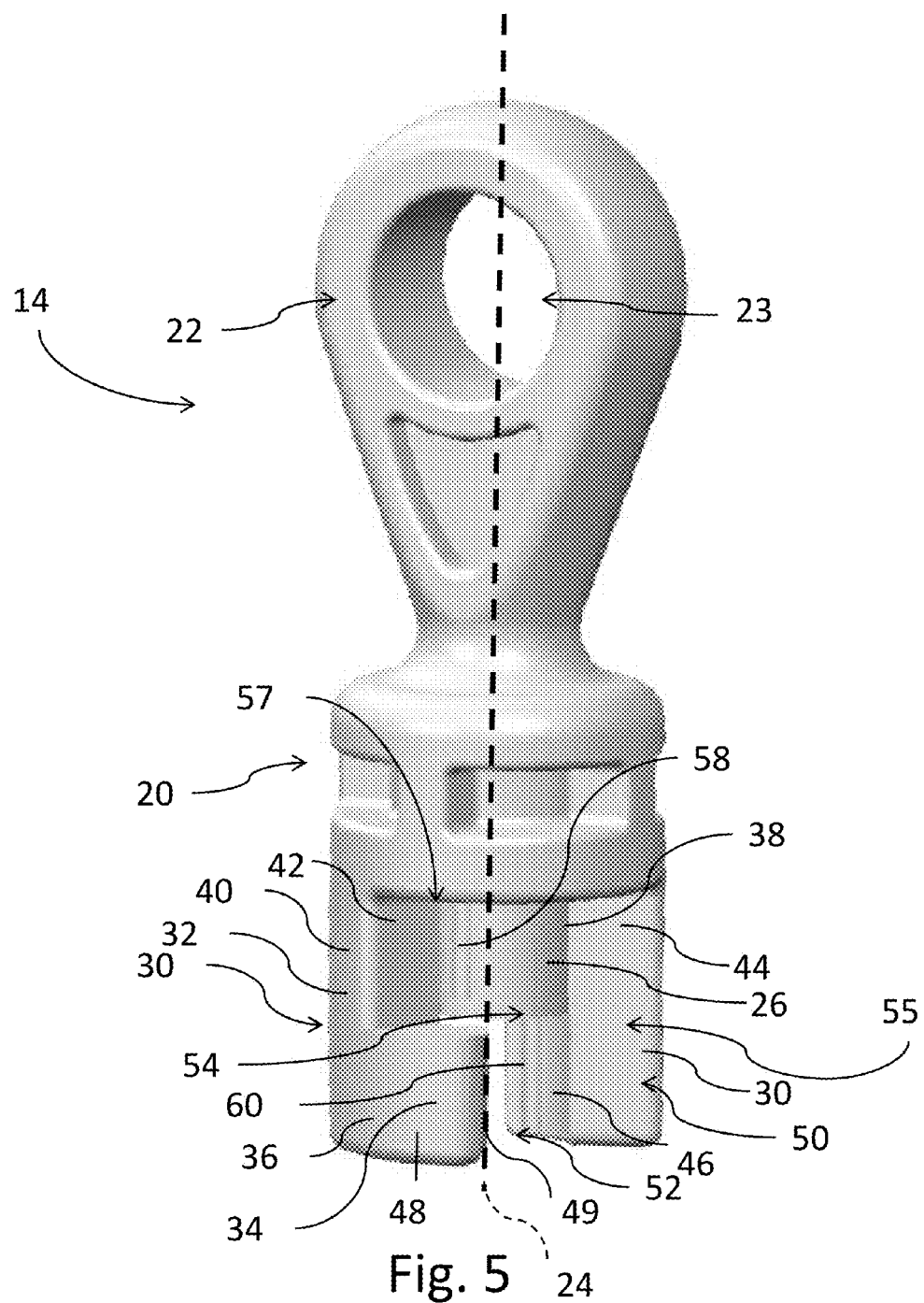
FIG. 5 is side elevation view of one of the identical float connector of FIG. 3.
Figure 6:
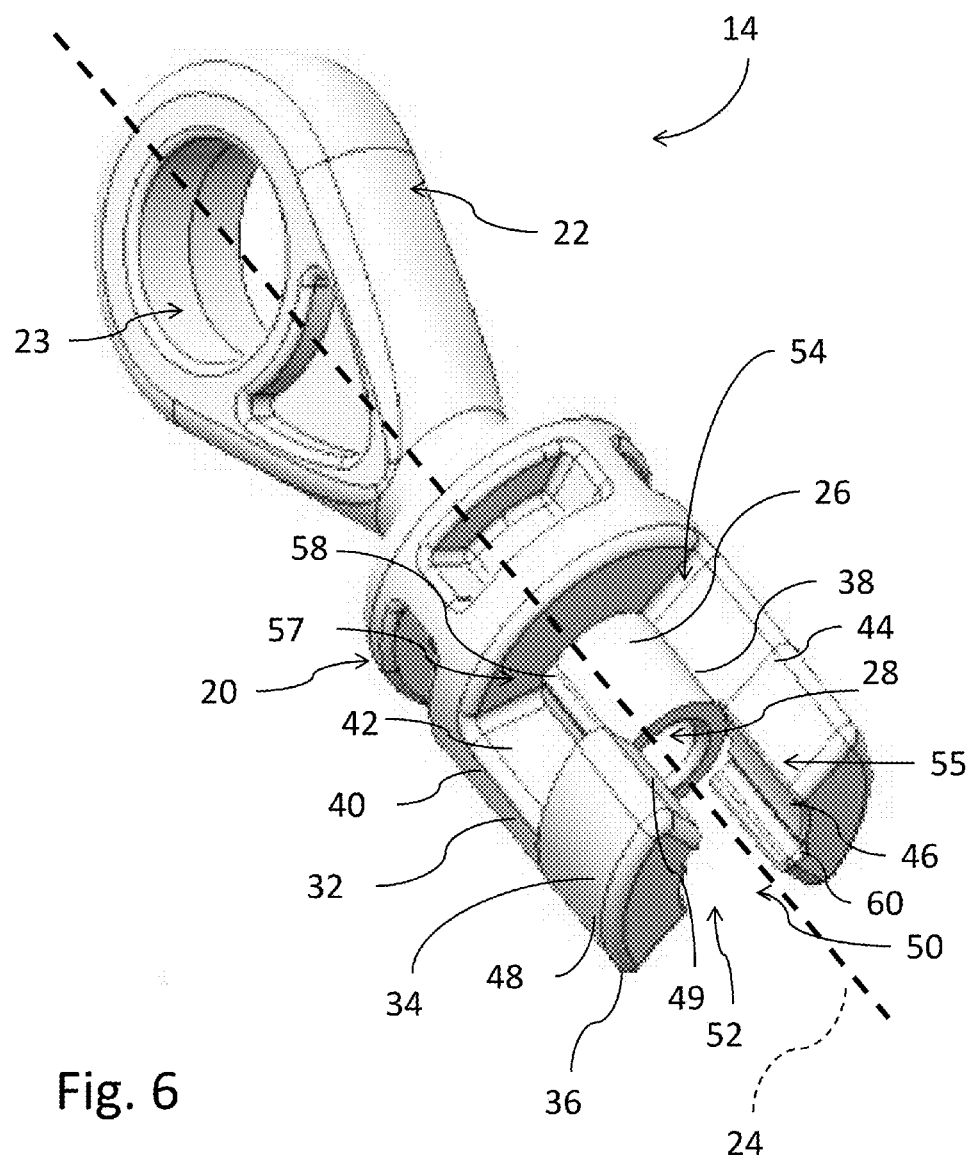
FIG. 6 is a perspective view of the float connector of FIG. 3.
Figure 7A:
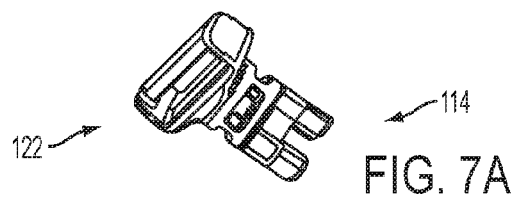
FIG. 7A is a perspective view of an alternative embodiment of a float connector of the present disclosure.
Figure 7B:
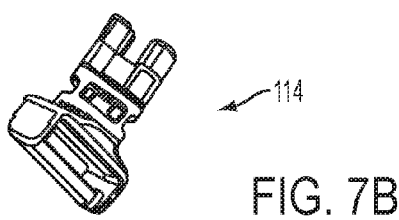
FIG. 7B is another perspective view of the float connector of FIG. 7A.
Figure 7C:
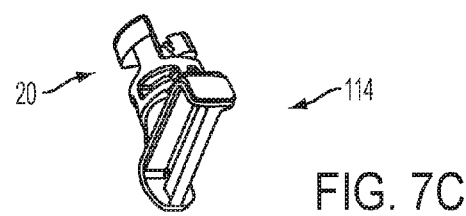
FIG. 7C is another perspective view of the float connector of FIG. 7A.
Figure 7D:
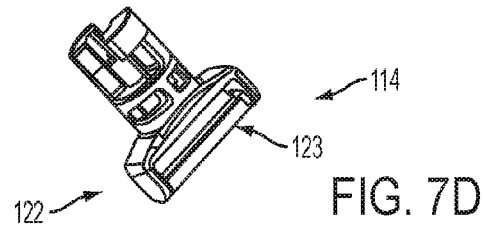
FIG. 7D is another perspective view of the float connector of FIG. 7A.
Figure 7E:
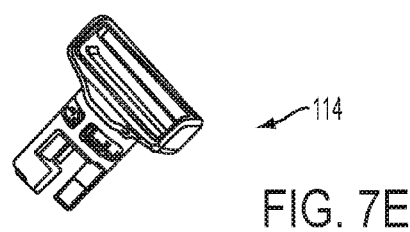
FIG. 7E is another perspective view of the float connector of FIG. 7A.
Figure 7F:
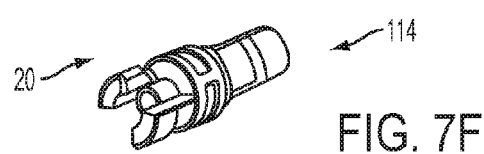
FIG. 7F is another perspective view of the float connector of FIG. 7A.

Each connector 14 further includes a plurality of L-shaped arms 30 that extend from connector base 20. As shown in FIGS. 5 and 6, each arm 30 includes an arm base 32 extending substantially parallel to axis 24 and a C-shaped finger 34 extending from arm base 32 radially about axis 24. Arm bases 32 and fingers 34 cooperate to define elbows 36 therebetween. As discussed below and shown in FIG. 4, arms 30 of respective connectors 14 of connector pair 18 intertwine and cooperate to couple connectors 14 together.

As shown in FIGS. 5 and 6, arm base 32 includes respective inner and outer circumferential sides 38, 40, each having a radius of curvature centered on axis 24. Arm base 32 also includes first and second side radial sides 42, 44 that extend between inner and outer circumferential sides 38, 40. Inner and outer sides 38, 40 extend for about 45 degrees about axis 24 and inner side 38 is integrally connected to cylindrical extension 26. First radial side 42 has a height substantially equal to a height of cylindrical extension 26 and about half a height of second radial side 44.

C-shaped fingers 34 include respective inner and outer circumferential sides 46, 48, each having a radius of curvature centered on axis 24. Fingers 34 further include a first radial side 49 that extends between inner and outer circumferential sides 46, 48. Inner and outer sides 46, 48 define a quadrant that extends about 90 degrees about axis 24, which is about twice the circumferential extent of inner and outer sides 38, 40 of arm base 32. First radial side 49 has a height substantially equal to a height of cylindrical extension 26 and about half a height of second radial side 44.

According to the preferred embodiment of the present disclosure, each connector 14 has two arms 30. According to the preferred embodiment of the present disclosure, the circumferential extent of arms 30 are determined by the number of arms 30 provided on each connector 14. For example, the circumferential extent of inner and outer sides 46, 48 of fingers 34 is about 360 degrees divided by two, divided by the number of arms 30 (i.e. two), which is about 90 degrees. The circumferential extent of inner and outer circumferential sides 38, 40 of arm bases 32 are about half of the circumferential extent of inner and outer sides 46, 48 of fingers 34 (i.e. about 45 degrees). According to alternative embodiments, fewer or more arms may be provided, which could increase or decrease the circumferential extent of the arms. For example, in a three arm embodiment, the circumferential extent would decrease (ex. 60 degrees for the inner and outer circumferential sides of the fingers and 30 degrees for the inner and outer circumferential extent of the arm bases.

According to the preferred embodiment of the present disclosure, arms 30 and cylindrical extension 26, and connector base 20 cooperate to define space 50 therebetween sized to receive cylindrical extension 26 and arms 30 of another connector 14 of connector pair 18 that is coupled thereto. Space 50 includes a cylindrical space 52 sized to receive cylindrical extensions 26 and L-shaped spaces 54 sized to receive L-shaped arms 30. L-shaped spaces 54 include first and second legs 55, 57. Two of fingers 34, cylindrical extension 26, and connector base 20 cooperate to define first legs 55 of L-shaped spaces 54 that are sized to receive fingers 34 of another connector 14 of the connector pair 18 during insertion of connectors 14 together as described below. Each finger 34, cylindrical extension 26, and connector base 20 cooperate to define second legs 57 of L-shaped spaces 54 that are sized to receive fingers 34 of another connector 14 of the connector pair 18 when connectors 14 are fully connected as described below. Portions of second legs 55 of L-shaped space 54 defined by cylindrical extension 26 are cylindrical providing second legs 55 with a C-shape.

To couple connectors 14 of connector pair 18 together, axes 24 of the respective connector 14 are aligned with arms 30 of one connector 30 aligned with L-shaped spaces 54 of the other connector 14. Connectors 14 are then moved toward each other along axes 24 and twisted about axes 24 in opposite directions. After this twisting, fingers 34 of each connector 14 axial overlap with fingers 34 of one connector 14 axially positioned between fingers 34 of the other connector 14 and connector base 20 of the other connector 14. Portion of finger-receiving second legs 55 of L-shaped spaces 54 are positioned axially directly between fingers 34 and loop 22. When in this position, the respective C-shaped fingers 34 block the removal of the other C-shaped fingers 34 and keep the respective connectors 14 coupled together when flexible lines 18 apply force to connectors 14. To uncouple connectors 14, the respective connectors 14 are twisted in the opposite directions so that the respective fingers 34 no longer axially overlap and connectors 14 are pulled axially away from each other.

According to the present disclosure, each connector 14 includes two detent pairs that resist rotation of connectors 14 apart from each other. Each detent pair includes a rib 58 integral with cylindrical extension 26 that is parallel with axis 24 and adjacent portions 57 of L-shaped spaces 54. The two ribs 58 are positioned on directly opposite sides of cylindrical extension 26 (ex. 180 degrees apart). Each detent pair further includes a recess 60 in an inner circumferential side 46 of each of C-shaped fingers 34. Ribs 58 and recesses 60 of one connector 14 are positioned to align with respective ribs 58 and recesses 60 of the other connector 14 when connectors 14 are rotated relative to each other to the fully coupled position. Near the end of rotation to the fully coupled position, fingers 34 flex radially outward as ribs 58 ride over inner circumferential sides 46 of fingers 34. When ribs 58 are positioned over recesses 60 in the fully coupled position, fingers 34 flex radially inward to position respective ribs 58 in respective recesses 60. When positioned in recesses 60, ribs 58 resist coming out of recesses 60 to maintain connectors 14 in the coupled position until enough torque is applied to force ribs 58 out of recesses 60 at which point fingers 34 flex radially outward.

An alternative embodiment float connector 114 is shown in FIGS. 7A-F. Float connector 114 includes a connector body 20 substantially identical to body 20 of float connector 14 and a loop 122 that includes a rectangular opening 123 for a strap (not shown).

Although the present invention has been described in detail with reference to preferred embodiments, variations and modifications exist within the scope and spirit of the present invention as described and defined in the following claims.

What is claimed is:

1. A connector of a connector pair including
a connector base having an axis,
a loop coupled to the connector base and configured to receive a flexible line,
an extension centered on the axis,
a plurality of arms extending from the connector base and cooperating to define a space therebetween sized to receive an extension of another connector of the connector pair, wherein each of the plurality of arms includes at least one finger extending from each of the arms, and
a rib configured to engage with a recess of the other connector of the connector pair to prevent rotation, the rib being integrally formed as a single one-piece structure with the connector and configured to be positioned radially between a radially interior surface of one of a plurality of arms of the other connector and a radially exterior surface of the extension of the connector when the connector pair is coupled together.

2. The connector of claim 1, wherein the extension of the connector is cylindrical and the space is at least partially cylindrical.

3. The connector of claim 1, wherein the extension of the connector and at least one of the plurality of arms cooperate to define a detent pair.

4. The connector of claim 3, wherein the detent pair includes a recess and the rib spaced apart from the recess.

5. The connector of claim 1, wherein each of the fingers and the connector base cooperate to define a space between each finger and the connector base, each space between each of the fingers and the connector base sized to receive a finger of the other connector of the connector pair.

6. The connector of claim 5, wherein the extension of the connector includes half of a detent pair positioned adjacent to the space between each of the fingers and the connector base.

7. The connector of claim 6, wherein the half of the detent pair is the rib.

8. The connector of claim 1 further including the flexible line, wherein the flexible line is configured to be received by the loop.

9. A connector of a connector pair including
a connector base having an axis,
a loop coupled to the connector base and configured to receive a flexible line,
an extension centered on the axis,
a plurality of arms extending from the connector base, each of the plurality of arms including at least one finger extending from each of the arms, each of the fingers and the connector base cooperating to define a finger-receiving space between each finger and the connector base, each finger-receiving space sized to receive a finger of another connector of the connector pair, and
at least one detent configured to couple with a corresponding detent of the other connector of the connector pair through rotation of the at least one finger of each of the arms of the connector into a finger-receiving space of the other connector and to be positioned radially between the radially interior surface of one of a plurality of arms of the other connector and a radially exterior surface of the extension of the connector when the connector pair is coupled together, wherein the at least one finger of each of the arms of the connector is configured to flex radially outward during the rotation, and the radially interior surface faces an axis of a connector base of the other connector.

10. The connector of claim 9, wherein the at least one finger of each of the plurality of arms is C-shaped.

11. The connector of claim 10, wherein the at least one C-shaped finger of each of the plurality of arms defines a quadrant.

12. The connector of claim 9, wherein adjacent arms cooperate to define a space, the finger-receiving space and the space between adjacent arms defining an L-shaped space configured to receive an arm of the other connector of the connector pair.

13. The connector of claim 12, wherein the L-shaped space includes first and second legs, and the second leg includes the finger-receiving space.

14. The connector of claim 13, wherein the second leg of the L-shaped space is C-shaped.

15. The connector of claim 9, wherein the at least one finger of each of the plurality of arms includes half of a detent pair.

16. The connector of claim 9, wherein the finger-receiving space is positioned between the at least one finger of each of the plurality of arms and the loop.

17. The connector of claim 9 wherein the at least one detent comprises a first detent and a second detent, the first detent extending from a top end to a bottom end of the extension centered on the axis of the connector base and the second detent extending from a top end to a bottom end of at least one of the fingers.

18. The connector of claim 9, wherein the at least one detent is a rib and the corresponding detent is a recess, and wherein the at least one finger of each of the arms of the connector is configured to flex when rotated over the rib.

19. The connector of claim 9, wherein the at least one detent is positioned along an interior surface of the at least one of the plurality of arms.

20. The connector of claim 9, wherein the flexible line is coupled to a flotation device.

21. A connector of a connector pair including
a connector base having an axis, an opening member coupled to the connector base and defining an opening sized to receive a flexible strap,
an extension centered on the axis,
a plurality of arms extending from the connector base, each of the plurality of arms including at least one finger extending from each of the arms, each of the fingers and the connector base cooperating to define a finger-receiving space between each finger and the connector base, each finger-receiving space sized to receive a finger of another connector of the connector pair,
a first detent positioned on a radially exterior surface of the extension, and
a second detent positioned on a radially interior surface of at least one of the plurality of arms, the radially interior surface being opposite a radially exterior surface of the at least one of the plurality of arms,
wherein the first and second detents are configured to engage with detents of the other connector of the connector pair.

22. The connector of claim 21, wherein the plurality of arms and fingers are configured to intertwine with a plurality of arms and fingers of the other connector of the connector pair when the connectors are engaged with each other.

23. The connector of claim 21, wherein the flexible strap is coupled to a flotation device.

24. A connector pair including a first connector and a second connector, each of the connectors including:
a flexible line,
a connector base,
a loop coupled to the connector base and configured to receive the flexible line, and
means for intertwining the connector pair, the intertwining means of each connector including half of at least one detent pair and configured such that, when the at least one detent pair is coupled through forward rotation of the first connector relative to the second connector, the at least one detent pair is coupled and obscured by the forward rotation while an empty space extends between an entire rearward surface of the first connector and an entire opposing surface of the second connector, wherein the entire rearward surface is opposite the forward rotation.

25. The connector pair of claim 24, wherein the intertwining means of each connector includes a pair of spaced-apart arms.

26. The connector pair of claim 25, wherein each of the spaced-apart arms includes a C-shaped finger.

27. The connector pair of claim 26, wherein the C-shaped finger of each of the spaced-apart arms and the connector base cooperate to define a C-shaped space, each C-shaped spaced sized to receive a finger of the other connector of the connector pair.

28. The connector pair of claim 27, wherein each connector further comprises an extension, wherein the extension and the at least one finger of each of the spaced-apart arms cooperate to define a detent pair configured to engage with a detent pair of the other connector of the connector pair to prevent rotation.

29. The connector pair of claim 24, wherein the flexible line of the first connector is coupled to a first flotation device and the flexible line of the second connector is coupled to a second flotation device, whereby the first and second flotation devices are coupled together when the first and second connectors are coupled together.

30. The connector pair of claim 24, wherein the flexible line of at least one of the first connector and the second connector is coupled to a flotation device.

* * * * *